(12) United States Patent
Notaras et al.

(10) Patent No.: US 6,253,896 B1
(45) Date of Patent: Jul. 3, 2001

(54) CLUTCH STRUCTURE

(76) Inventors: John Arthur Notaras; Angelo Lambrinos Notaras, both of 9 Fred Street, Lilyfield, NSW, 2040 (AU)

( * ) Notice: Subject to any disclaimer, the term of this patent is extended or adjusted under 35 U.S.C. 154(b) by 0 days.

(21) Appl. No.: 09/423,007

(22) PCT Filed: Apr. 28, 1998

(86) PCT No.: PCT/AU98/00306

§ 371 Date: Jan. 31, 2000

§ 102(e) Date: Jan. 31, 2000

(87) PCT Pub. No.: WO98/49457

PCT Pub. Date: Nov. 5, 1998

(30) Foreign Application Priority Data

Apr. 28, 1997 (AU) .................................................. PO 6446
Oct. 14, 1997 (AU) .................................................. PO 9786

(51) Int. Cl.[7] ..................................................... F16D 43/04
(52) U.S. Cl. ...................................... 192/105 CD; 192/75
(58) Field of Search ........................ 192/105 R, 105 CP, 192/105 CD, 105 CE, 75

(56) References Cited

U.S. PATENT DOCUMENTS

| 2,087,968 | * | 7/1937 | Dodge | 192/105 R |
| 2,275,046 | * | 3/1942 | Harris | 192/103 B |
| 4,192,412 | | 3/1980 | Stoner . | |
| 4,903,810 | | 2/1990 | Stock . | |
| 5,440,796 | | 8/1995 | Deggau et al. . | |

FOREIGN PATENT DOCUMENTS 30 48 886   9/1981   (DE) .

* cited by examiner

*Primary Examiner*—Charles A. Marmor
*Assistant Examiner*—Saúl Rodriguez
(74) *Attorney, Agent, or Firm*—Jensen & Puntigam, P.S.

(57) ABSTRACT

A clutch shoe (10, 31, 61, 62, 70) for a clutch assembly (1), the clutch shoe having a clutch drum engaging portion (12, 71) having a clutch drum engaging face (72); the clutch shoe including a flange (14, 75) integrally formed with an extension extends substantially at right angles from the clutch drum engaging portion about a fold line (76). The method of forming the clutch shoe comprises stamping blanks from sheet steel and bending the blanks about the fold line (76) so as to provide the integrally formed flange (14, 75) extending substantially at right angles from a clutch drum engaging face (72) of the clutch drum engaging portion (71).

9 Claims, 7 Drawing Sheets

CLUTCH STRUCTURE

This invention relates generally to clutches and in particular it relates to centrifugal force actuated clutches.

BACKGROUND

In many powered tools a clutch is interposed between a driving motor and the actual tool and which work is to be done. This is almost invariably the case where the motor is an internal combustion engine. At engine idling speed the clutch is disengaged and the tool is inactive. When the driven part of the tool, e.g. a chain saw, a brushcutter or a lawn edger, etc., is to be activated the engine revolutions are increased and this increased the centrifugal force acting on a movable clutch member and clutch engagement results.

Because of the small space usually available for such clutches there has been a tendency to design intricate precision clutch mechanisms for such machines and tools. The clutch mechanisms include a driving assembly having a number of movable shoes and a driven part engagable by the shoes. Commonly, the driving assembly includes a clutch shoe support called a clutch hub for fixing to a drive shaft and the hub is provided with radially arranged clutch shoe guide means. Clutch shoes supported by the guide means are designed to move along the guide means under the influence of centrifugal force against the action of return springs acting on the clutch shoes. The clutch shoes are urged by the centrifugal force into driving contact with the internal surface of a drum, which constitutes the clutch mechanism driven part, and which houses the clutch shoes. The drum is drivingly connected to the tool to be operated.

Centrifugal clutches of common form depend on the centrifugal force acting on the clutch shoe to overcome the return spring tension, and for the clutch shoe to "lock" onto the clutch drum by friction grip. It has always been standard practice typically for the abovementioned tools to make solid, and therefore heavy, wide surface (usually 12–14 mm width) clutch shoes to achieve a good friction grip, which results from the greater centrifugal force available by using heavier shoes.

Typically, such clutch hub and clutch shoes are made by a powder metallurgy (PM) process as a sintered product. The PM parts individually made in special multiple action presses with powdered metal being compressed into a "biscuit like" consistency. The items are then baked in an oven to fuse the powder into a rigid state. This process from a manufacturing point of view is slow and capital intensive for both the tooling and PM presses. The items are thus expensive to manufacture.

Another clutch driving arrangement is made up of a driven clutch hub to which is pivotally connected multiple (usually two) clutch shoes, with the pivot point at or near one end of each clutch shoe. When the clutch shoes, with the pivot point at or near one end of each clutch shoe. When the clutch shoes swing out, the arcuate shoes engage the surface of the clutch drum. This occurs when the required RPM is sufficient to overcome the restraining spring tension of the restraining spring. Usually one spring is used connecting the two outer ends of the two shoes. The hub and clutch shoes for this clutch arrangement can be made by the PM process.

Another manufacturing process involves manufacturing a number of components stamped (blanked) from steel sheet metal, usually about 2 mm thick, which are then stacked and riveted together, usually about 6 or 7 pieces (laminates) each approximately 2 mm in thickness are required to achieve the required 12 mm to 14 mm surface width, thickness and weight for clutch shoes manufactured in this manner. If the clutch shoe is intricate in shape, for example having small holes for engagement by the ends of springs and with small radii at various corners, then to increase stamping tool life, thinner sheet metal would be used. It follows that more laminates would then be required to achieve the required surface width, show thickness and weight.

Another method of manufacturing is by die casting of aluminium or zinc, to form either or both the clutch hub and/or the clutch shoe. This is a lower cost method of production than the PM process but these cast clutch shoes suffer the problem of fast frictional wear and therefore is not practical in moderate to high use situations. To reduce the substantial wear on cast clutch shoes, linings (of material similar to automotive brake linings) are glued to the outer curved area of the cast clutch shoe which makes contact with the clutch drum. This is an expensive added step in the manufacturing process and negates the cost savings of die casting.

The purpose of the clutch mechanism in the unit driven by an internal combustion engine is two fold, firstly to allow the engine to idle over with no clutch engagement and secondly to prevent damage to the power unit in the case of overload, possibly as a result of a tool driven by the clutch becoming jammed. In the latter case when the load on the tool as a result of the jamming exceeds the clutch grip the clutch will slip. Where the power unit is an electric motor the clutch is provided as an overload avoidance means to prevent damage to the electric motor when the driven tool jams.

One object of this invention is to provide a simple wide surface construction driving assembly for a centrifugal clutch which is simpler and less expensive to make than the driving assemblies now commonly in use and generally as described above. The economy arises out of the use of parts which are few in number, involve a much lower material cost and are more readily and less expensively made than those used in the described prior art driving assemblies.

Another object of the invention is to provide a very light weight clutch mechanism, thereby reducing the weight of hand held tools.

A third object of the invention is to allow, there the power is provided in an on/off sequence (as with an electric motor as a power source), the possibility of elimination of return springs, but an arrangement where the clutch mechanism provides, smooth unabrupted power transmission and still provides overload protection through the clutch shoes.

BRIEF DESCRIPTION OF THE INVENTION

Broadly stated, the present invention provides a centrifugal clutch driving assembly said assembly including a clutch shoe supporting means adapted at a mounting position for fixing to a drive shaft, said assembly including a plurality of clutch shoes each having a clutch drum engaging face for engagement with a clutch drum and each said clutch shoe having a formed flange substantially at right angles to said clutch drum engaging face of said clutch shoe whereby and shoes are respectively pivotally mounted by first ends of the shoes to said clutch shoe supporting means.

In a further broad form of the invention there is provided a method of manufacture of a centrifugal clutch of the type defined above, said method comprising:

A. Stamping a sheet metal blank and

B. Bending said blank whereby said flange is aligned substantially at right angles to said clutch drum engaging face.

In a particular form, said blank is further bent so as to provide a clutch drum contacting alignment to said clutch drum engaging face.

In a preferred arrangement each shoe is blanked and formed from sheet metal, and has a cross-sectional shape through its outer part and its flange which is generally of "L" shape. Metal thickness can vary between 1 mm and 4 mm thickness. A 2 mm thickness achieves an excellent result.

In a further preferment the shoes are biased to a retracted position by springs. The force exerted on the shoes by the springs is such that at a given speed of rotation for the driving assembly the centrifugal force acting on the shoes will overcome the applied spring force and the shoes will pivot to a clutch drum engaging position.

Embodiments of the invention using tension or compression springs or any other type of spring are possible. Where the springs are of the tension type they can be mounted so as to connect the shoe support to the respective shoes at positions on the shoes, which trail the pivotal connections between the shoes and the shoe support, and/or a position that is any distance from the pivotal position of the shoe. In another arrangement the springs interconnect one shoe to the other shoe(s) and draw the shoes together to oppose centrifugal force tending to move the shoes apart.

Where compression springs are used on configuration could have a shoe of generally "C" form with the pivotal connection between the shoe and the shoe support nearer one end of the "C" than the other, thereby to provide a short leg and long or heavier leg for the "C". The long or heavier leg would be curved and provide the clutch drum engaging portion of the shoe. The short leg would lie adjacent the shoe support and be biased away from the shoe support by a compression spring between the short leg and the shoe support.

In all of the embodiments of the invention the curved outer parts of said shoes can be in trailing relationship to the first ends of the shoes having regard to the intended direction of rotation of said support. This is advantageous where springs are not used, as in electric motor driven clutches to provide smooth transmission of engagement, as well as providing smooth overload protection. If the shoes without spring are run in the opposite direction then engagement can be abrupt which can cause damage to the driven part, However, when the assembly is used in the opposite rotation in which case the cured outer parts of the shoes will be in a leading and not a trailing relationship to the pivotal part of the shoe, when used with retaining springs to provide smooth transition of engagement, then the shoes directly lock grip with greater efficiency onto the rigid metal clutch drum which therefore allows this embodiment of the invention to be made smaller in over physical size.

With the construction envisaged by the present invention the material cost is very low, the tooling expenses are low, and simple low cost mechanical press working machines are used. The tooling and capital equipment is low cost, output is high, and thus the cost of the wide surface clutch mechanism is very greatly reduced compared to other designs and methods of manufacture. Furthermore, because of its simple construction the proposed clutch mechanism is much lighter in weight than commonly used clutches for the same purpose and consequently there is a significant reduction in the total weight of a hand held tool to which it is fitted.

In a further broad form of the invention there is provided a clutch shoe for a clutch assembly; said clutch shoe including a clutch drum engaging portion having a clutch drum engaging face; said clutch shoe further including a flange integrally formed with said clutch drum engaging portion; said flange folded about a fold line substantially at right angles to said drum engaging face; said flange including pivot means whereby said flange is pivotally engagable to rotating means whereby, in use, said clutch drum engaging portion of said clutch shoe rotates about said pivot means such that at least a portion of said clutch drum engaging face moves into frictional engagement with a working face of a clutch drum.

Preferably the clutch shoe is formed from a single sheet of steel by a stamping and forming technique.

Preferably the clutch shoe further includes spring engagement means for biasing a first clutch shoe with respect to a second clutch shoe.

Preferably said curved clutch drum engaging portion includes a flat portion adjacent said fold line whereby said fold line is substantially straight.

BRIEF DESCRIPTION OF THE DRAWINGS

Embodiments of the invention will now be described with reference to the accompanying drawings wherein.

DETAILED DESCRIPTION OF PREFERRED EMBODIMENTS

Figure 1:
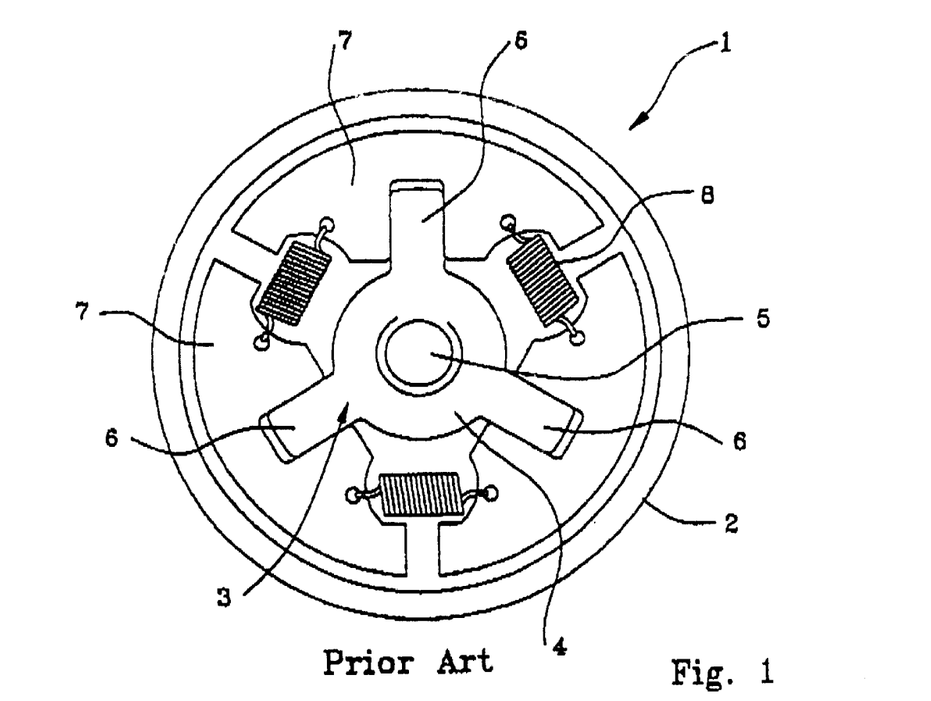
FIG. 1 shows in side view a prior art centrifugal clutch.

With reference to the accompanying drawings, FIG. 1 illustrates a typical prior art centrifugal clutch as commonly in use. The clutch 1 includes a drum 2 enclosing a shoe support 3 with a hub 4 having a central threaded hole 5 whereby the clutch hub 4 is fixed to a drive shaft (not shown) of a power unit, such as an internal combustion engine. Shoe movement guiding and supporting arms 6 radiate from the hub 4.

Mounted slidably on each arm 6 there is a shoe 7 each with an other face generally curved to correspond with the internal curvature of the face of drum 2. The shoes 7 are linked by tension springs 8.

As will be understood, when the shoe support 3 is rotated at increasing speed the centrifugal force acting on the shoes 7 will overcome the restraining action of the tension springs 8 and the shoes 7 will move along the arms 6 until the outer faces of the shoes 7 engage the drum 2. As a result the drum 2 will rotate with substantially, and at high speeds, the same speed as the shoe support 3.

Figure 2:
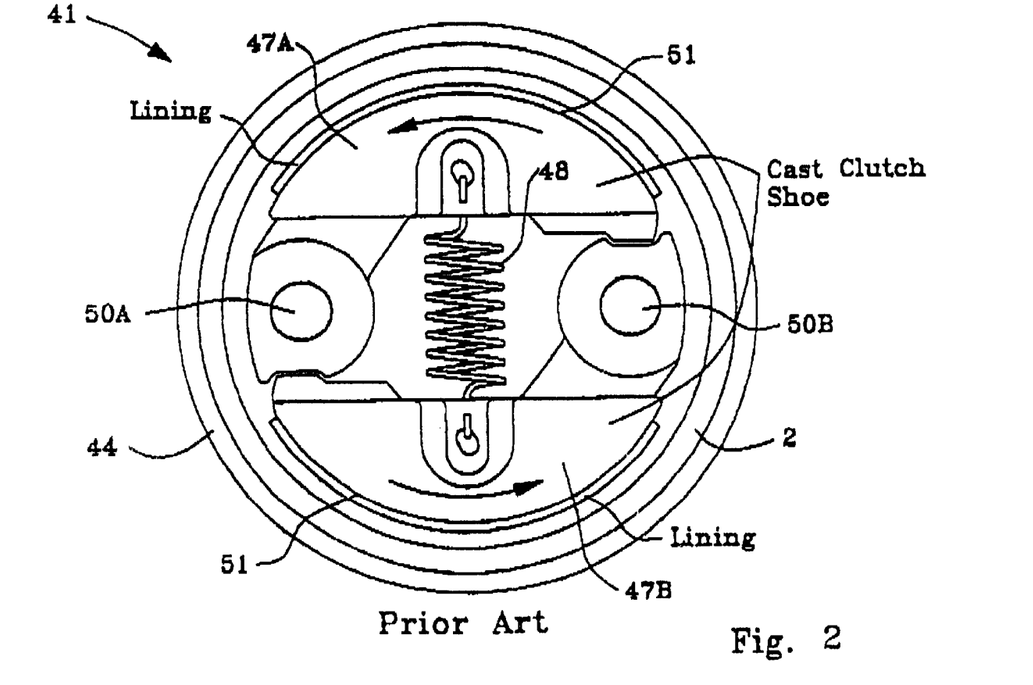
FIG. 2 is a side section view of another prior art centrifugal clutch utilising a cast shoe.

FIG. 2 illustrates an alternative prior art clutch arrangement generally fitted to an internal combustion engine flywheel, rotor and/or a fan 44, comprising, in this instance, a clutch arrangement 41 to which is symmetrically, pivotally connected a first clutch shoe 47A and a second clutch shoe 47B. Each shoe comprises a casting and includes a pivot aperture 50A, 50B respectively defined therein.

Because the shoe is made from case material it includes a lining 51 in order to provide resistance to wear. The symmetrical mounting of the two shoes 47A, 47B about a central axis of the clutch shoe support 44 allows a tension spring 48 to interconnect the two shoes together so that they are biased about their pivot apertures 50 away from engagement with the linings 51 from clutch drum 2.

Figure 3:
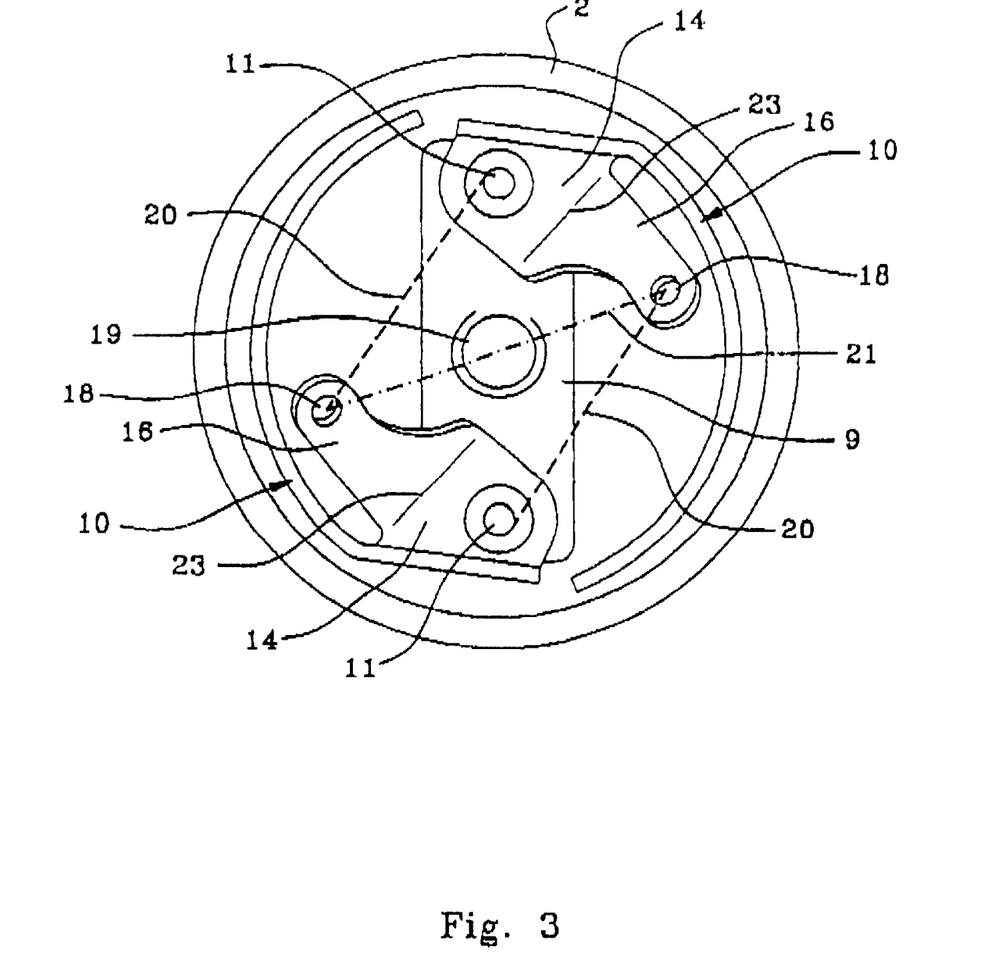
FIG. 3 illustrates in side view a clutch mechanism according to a first embodiment of the invention.

A first embodiment of the present invention is illustrated in FIG. 3. There is shown a clutch shoe support 9, in the form of a bar preferably (but not limited thereto) made from a number of like sheet metal strips of about 2 mm thickness, and there are two shoes 10 pivotally connected by pins 11 to the bar 9 at the respective ends of the bar. The bar can also be a single piece. The pins 11 each include a portion of smaller diameter which acts as a rivet to secure together the bar forming strips of the preferred laminated hub and produce the equivalent of unitary bar structure, and has portion of larger diameter which is used to pivotally support a shoe 10.

The clutch shoe support 9 includes a mounting hole 19 which can be threaded to engage the threaded end of a drive shaft, or it can be a hole adapted to receive and end part of a drive shaft there to abut a shoulder on the shaft against which the bar would be clamped by a nut engaged with a threaded portion of the drive shaft end part. Other suitable means may be used to fix the bar 9 to a drive shaft. Alternatively, the clutch shoe support 9 can be provided by a flywheel, rotor and/or fan where fitted.

Figure 4:
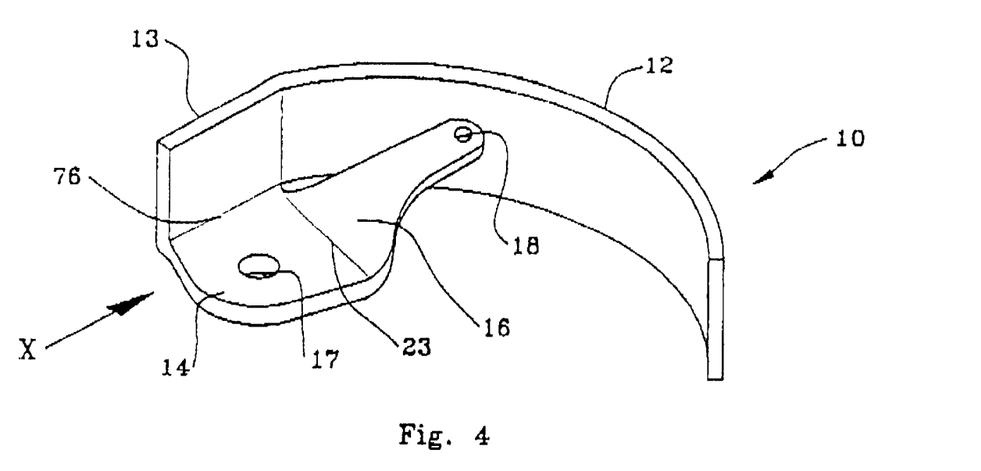
FIG. 4 is a perspective view of a shoe for use with the clutch mechanism of FIG. 3.

The detail of the shape of the shoes 10 can be best seen from FIG. 4. Each shoe includes a curved wide surface outer shell part 12 terminating at one end, preferably with (but not limited to) a flat part 13, having a flange 14 with incorporates an angled extension arm 16 lying within the shell part 12. The shoe parts 13 and 14 when viewed in the direction of the arrow X are in planes at right angles to each other in the form of an "L". Holes 17 and 18 are provided in the flange 14 and the arm 16 respectively for the pivot pine 11 and for the connection of a return spring (if required) in a manner to be described. As will be readily understood the shoe as proposed can be readily manufactured by stamping and forming techniques using sheet steel in a manner which is simple and inexpensive compared to sintering and casting techniques as used for the clutch components illustrated in FIGS. 1 and 2.

The technique involves use of flat mild to semi-spring steel typically 2 mm thick available in roll form from steel merchants and then feeding the steel through a press metal stamping machine of sufficient tonnage whereby the operations are performed either in two separate single tools, or preferably in a single follow-on tool to produce the clutch shoe in a single very fast and extremely low cost operation whereby in quick succession:

1. A flat blank of a shoe is produced and
2. The blank is formed by bending so that the preferred flat part 13 of shoe 10 is bent substantially at right angles to flange 14 of shoe 10 and the preferred curved shape of the shoe 12 is formed.
3. Optionally the angled extension arm 16 is bent from flange 14 about fold line 23.

The operation is inherently simple and produces shoes 10 which are immediately available, without necessary further modification or addition, for pivotal attachment to a hub or other shoe support means of the type previously described.

Figure 5:
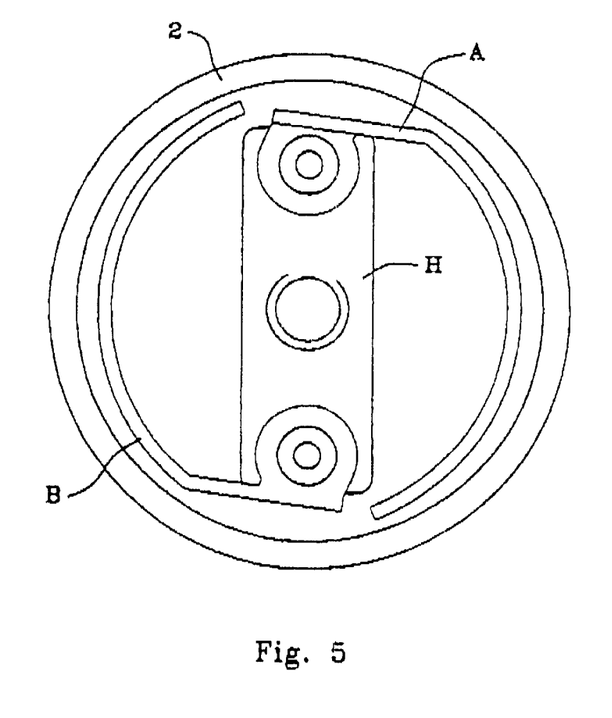
FIG. 5 illustrates, in plan view a hub and shoe arrangement of a clutch mechanism according to a second embodiment of the invention.
Figure 10:
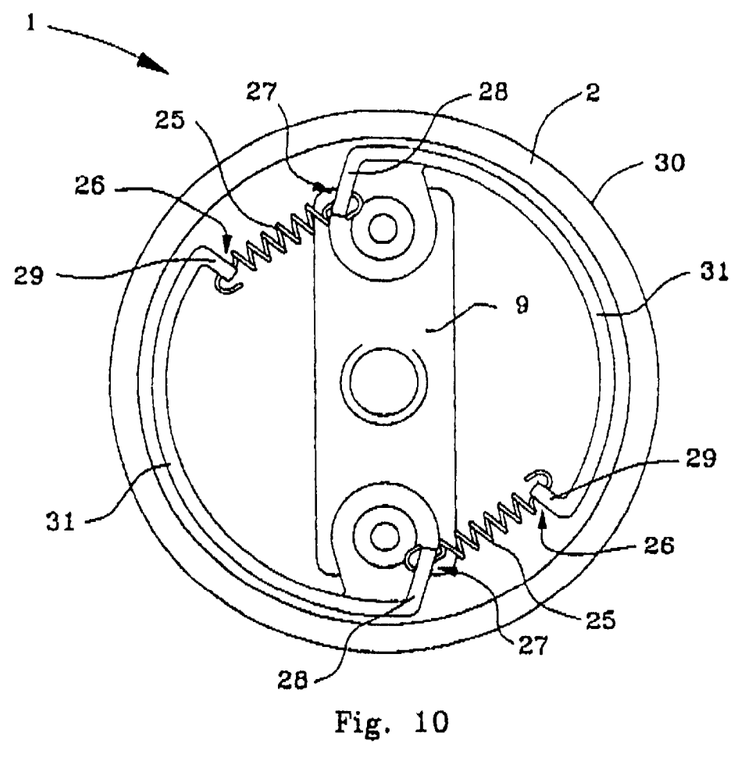
FIG. 10 is a plan view of a clutch mechanism according to a fourth embodiment of the invention.

There the shoes 10 are not to be connected to return springs the arms 16 may be eliminated, as shown in FIG. 5, or simply not coupled to a spring. FIG. 5 also shows, as an example, two different configurations of shoes. These shoes can be used each as a par of the same configuration. Clutch shoe A is inclined towards the reader and away from the clutch shoe support hub H whilst clutch shoe B is included away from reader and towards the clutch hub H. Where shoes return springs are required they can be connected as shown in FIG. 10 or in the two manners shown in broken lines in FIG. 3. in FIG. 3 in one manner, a spring indicated 21 is end connected or in the holes 18 of the arms 16 of the two shoes. In FIG. 3, in another manner, springs 20 engaged with the holes 18 of the arms 16 connect the arms 16 each to th pivot pin 11 of the other shoe. To accomplish this it is necessary to have a portion of the pin 11 upstanding above the flange 14, as indicated 22 in FIG. 7. As will be understood, the angled form of the arms 16 facilitates the mounting of the springs.

In the operational form of the invention the curvature of the shoe parts 12 is such that when the shoes 10, 31, 61, 62 pivot, there will be engagement between some or all of the curved outer surface of the shoe parts 12, 31, 35 and 36 and the inner surface of the drum 2.

Figure 8:
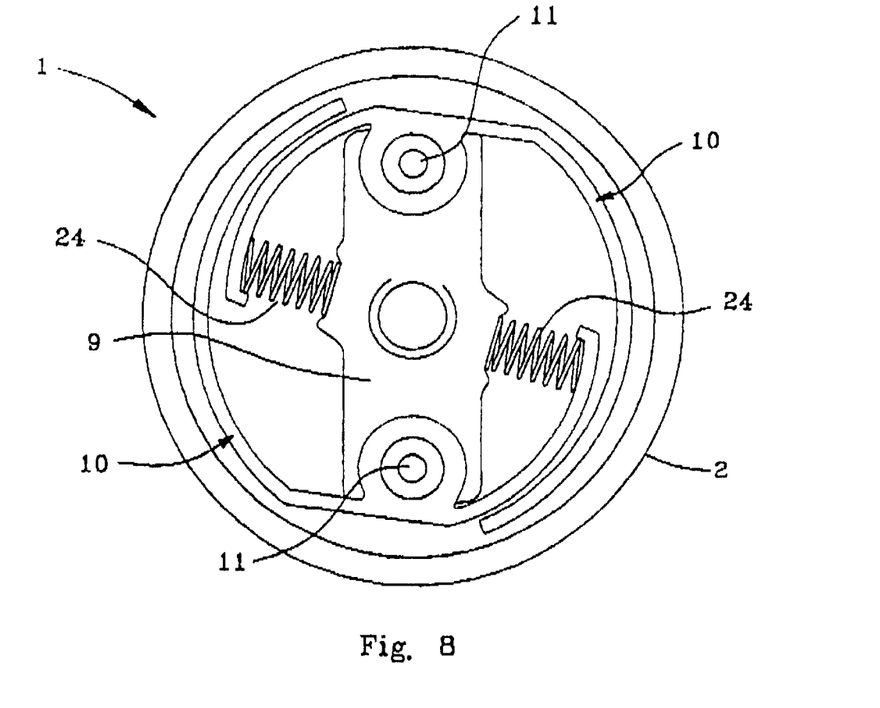
FIG. 8 illustrates, in plan view, a clutch mechanism according to a third embodiment of the invention.

The FIG. 8 arrangement is an alternative to the tension spring embodiments just described and is functionally the same with the compression springs 24 replacing the tension springs 20 or 21 to bias the shoes 10 to the retracted position.

Figure 9:
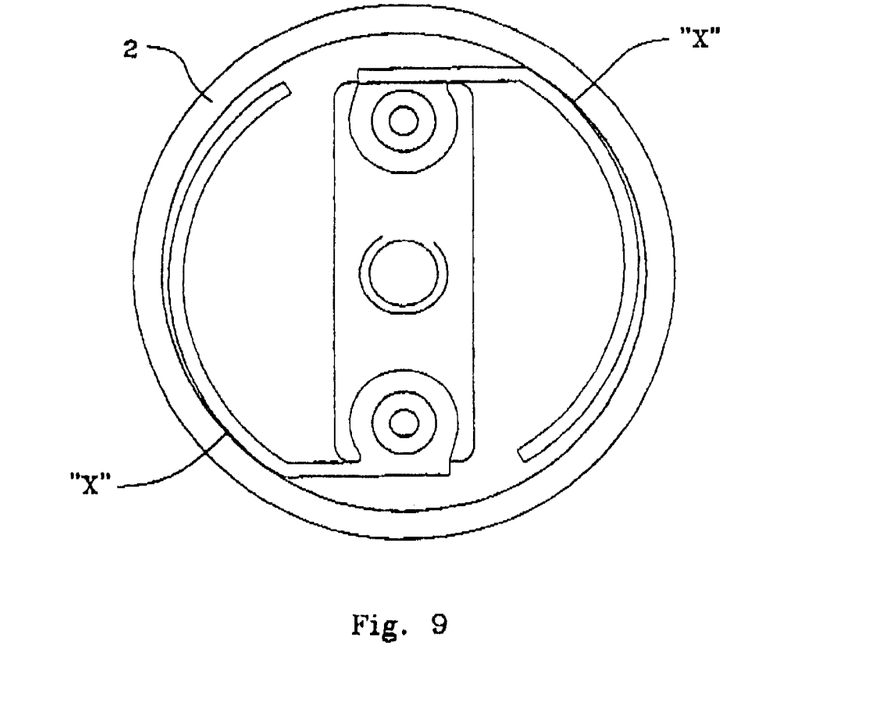
FIG. 9 is a plan view of a clutch mechanism according to a fourth embodiment of the invention.

In FIG. 9, which is an exaggerated form of the embodiment now to be described, the curvature of the face of the shoe is not such that the surface of the shoe face and the surface of the drum face can totally engage. The curvature is such that when first contact occurs between the shoe face and the drum face, indicated "X", the shoe face extending away from "X" will be spaced progressively further from the drum face. As a result, the more centrifugal force applied to the shoe the greater the pressure applied at the contact point "X" as the shoe tries to pivot to the position where the shoe and the drum faces are fully in contact.

FIG. 10 is a further embodiment showing clutch shoes 31 whereby the tension spring 25 is connected between hold 26 of the second end of each shoe to hold 27 at or near the first end of each shoe. The first and second ends of each shoe respectively have shoe sections 28 and 29 below the radius of the clutch drum 30 in order that there is sufficient clearance for spring 25 not to touch the clutch drum when the clutch shoes 31 engage the clutch drum.

Figure 11:
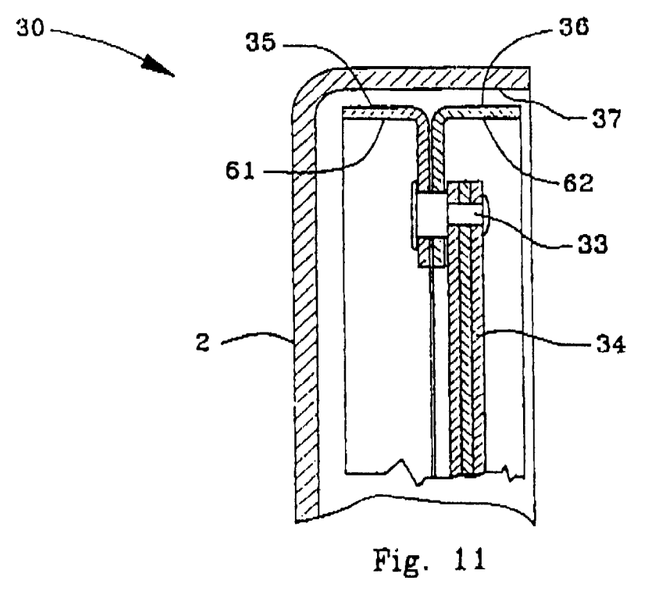
FIG. 11 is a side section view of part of an alternative clutch mechanism illustrating the manner of connection of dual, back to back shoes to the hub.

FIG. 1 illustrates an alternative clutch arrangement 30 whereby a first clutch shoe 61 is mounted symmetrically back to back with a second clutch shoe 62 as illustrated, both held in place to clutch shoe support 34 by means of pine 33. As previously; working face 35, 36 respectively, or a least portions thereof, engage with face 37 of clutch drum 2 when sufficient centrifugal force is exerted by appropriate rotation of support 34.

Figure 12:
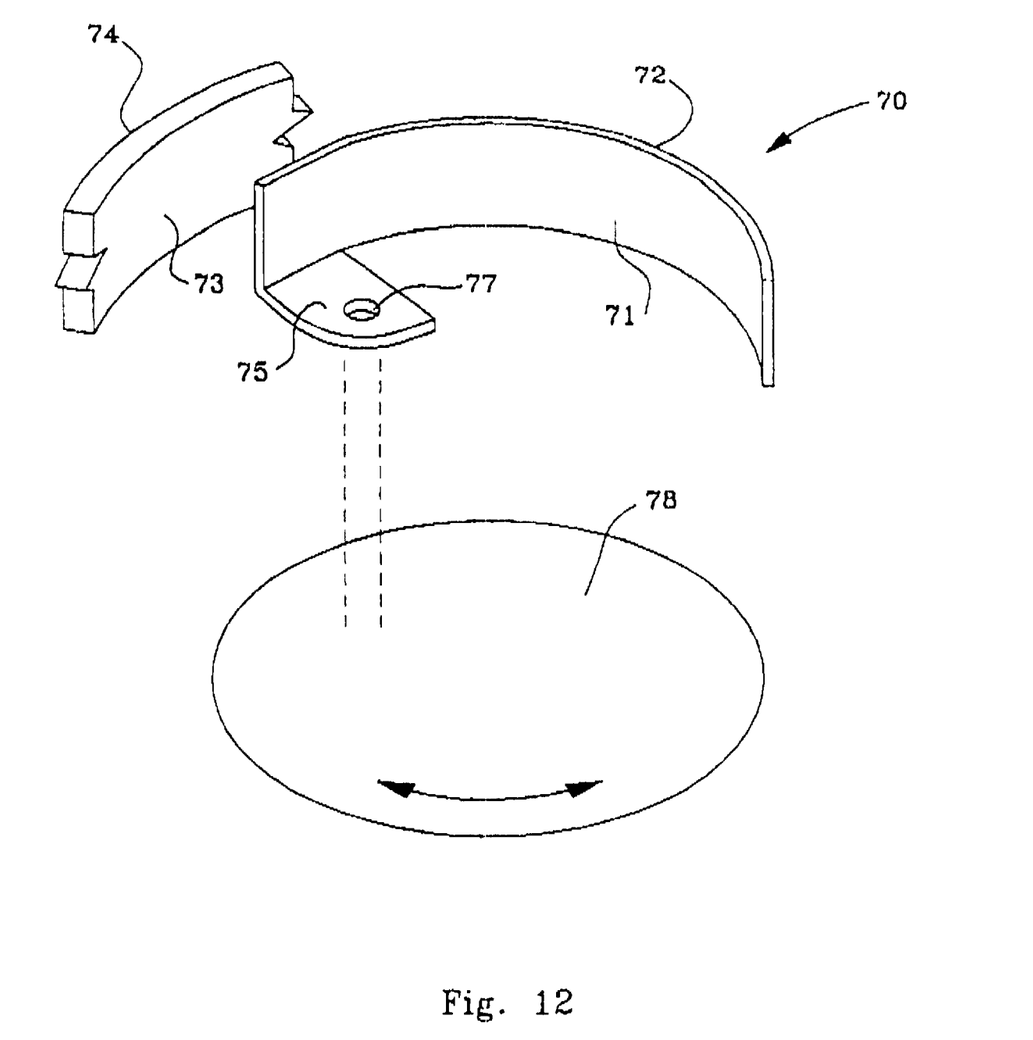
FIG. 12 is a perspective view of a clutch shoe according to a fifth embodiment of the invention.

With reference to FIG. 1 there is illustrated a clutch shoe 70 according to a fifth embodiment of the invention which comprises, in this instance, a curved clutch drum engaging portion 71 made from a single sheet of steel and having a correspondingly curved clutch drum engaging face 72 on an outer surface thereof adapted, over at least a portion thereof, to engage with a working face 73 of a clutch drum 74.

The clutch shoe 70 further includes a flange 75 integrally formed with and bent substantially at right angles from clutch drum engaging portion 71 about fold line 76.

Flange 75 includes pivot means which, in this instance, comprise an aperture 77 passing substantially at right angles through the place of the flange 75 and adapted to receive a pin or other fastener (not shown) there through for pivotal connection of the flange 75 to rotating means 78.

As previously described the clutch 70 is formed in a stamping operation from sheet steel including the steps of:

1. Punching a metal blank.

2. Forming the clutch drum engaging portion into a curved shape having a curved clutch drum engaging face 72 and 3. Bending the blank about fold line 76 so as to form flange 75 substantially at right angles to clutch drum engaging portion 71.

Figure 6:
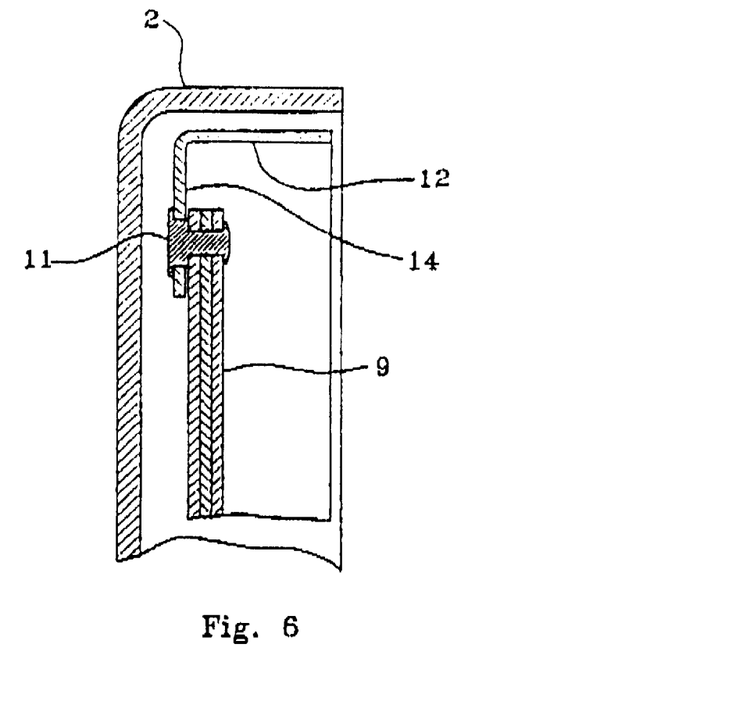
FIG. 6 illustrates, in end section view, a first manner of connection of the shoes to the hub.
Figure 7:
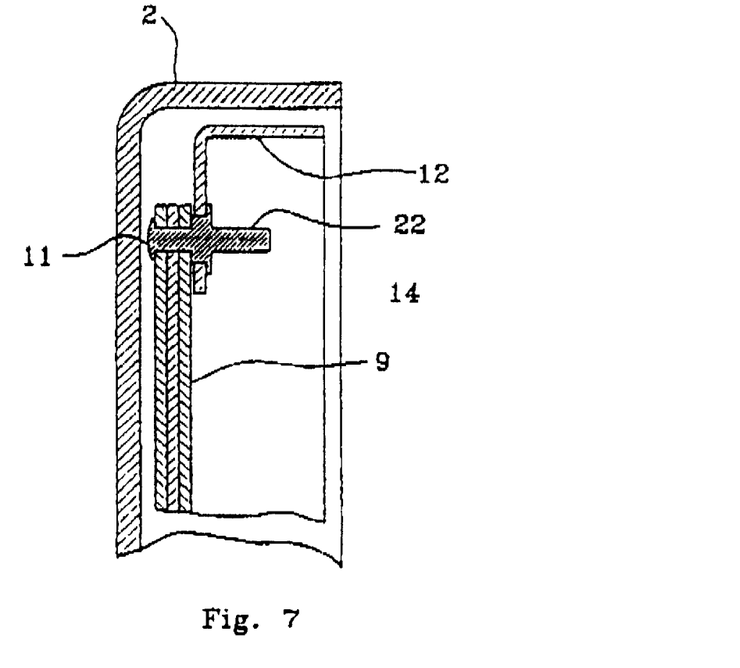
FIG. 7 illustrates, in end section view, a second manner of connection of the shoes to the hub of the clutch mechanism.

The presently preferred embodiments of the invention described can be varied in detail without departing from the inventive concepts disclosed herein directed to achieving the objectives of the invention set out above for example:

1. the shoes can be pivotally connected to any clutch shoe support in either of the manners shown in the partial cross sectional views FIGS. 6 and 7, with any types of pivot means.

2. Any of the clutches can be run in either direction either with or without a spring.

3. Shoe engagement and locking pressures can be adjusted by making the clutch shoes longer or shorter and/or wider or thinner together with the use of weaker or stronger springs or any combination of this.

4. In specific circumstance a surface treatment or lining can be applied to the drum engaging surface of the clutch shoe to modify gripping or other characteristics.

INDUSTRIAL APPLICABILITY

The clutch shoe and the assembly formed therefrom are applicable to use in all types of rotary powered products including but not limited to power tools and gardening equipment.

What is claimed is:

1. A centrifugal clutch of the kind comprising a hub mounted for rotation about a central axis of the clutch, a drum having a radially inner cylindrical surface coaxial with said central axis and surrounding said hub, and a plurality of shoes pivotally mounted on said hub for movement into frictional engagement with said body upon rotation of the hub at or above a predetermine speed, characterized in that each said shoe is formed from a single piece of sheet metal, in that each said shoe comprises an angle sectioned portion and an unflanged arcuate blade constituting and extension of a first flange of said angel sectioned portion, which blade is curved to enable a convex side of the blade to make area contact with said radially inner surface of said drum, and in that each said shoe is pivotally mounted on the hub for to an fro swing movement relative to the hub about a pivot axis, which is substantially parallel to said central axis and extends through said flange of said angle sectioned portion, between and engaged position wherein the blade contacts said drum as aforesaid and a disengaged position wherein said blade is clear of said drum.

2. A centrifugal clutch according to claim 1 wherein each said shoe is associated with at least one loading spring urging said each shoe to swing towards said disengaged position.

3. A centrifugal clutch according to claim 2 wherein each said shoe further comprises a cantilever means projecting from said angle sectioned portion with a spring retainer formation at or near a free end of said cantilever means and spaced from said pivot axis.

4. A centrifugal clutch according to claim 3 wherein said spring retainer formation is disposed on the same side of said pivot axis as is the blade of the shoe and said loading spring is a tension spring extending from said retainer formation.

5. A centrifugal clutch according to claim 3 wherein said spring retainer formation is disposed on the opposite side of said pivot axis as is the blade of the shoe and said loading spring is a compression spring bearing against said retainer formation.

6. A centrifugal clutch according to any one of the preceding claims wherein said hub comprises a plurality of superimposed sheet metal laminations secured together.

7. A centrifugal clutch according to any one of claims 1 to 5 wherein the sheet metal of said each shoe has a thickness within the range of from 1 mm to 4 mm, whereby said each shoe may be fully formed by stamping, punching and bending operations.

8. A centrifugal clutch according to claim 1 wherein said thickness is substantially 2 mm.

9. A centrifugal clutch according to claim 6 further, characterized in that each said shoe is pivotally mounted as aforesaid by means of a pivot pin which is an integral extension of a rivet securing said laminations together and which extends through a clearance hold in said second flange of said angle sectioned portion of said each shoe.

* * * * *